(12) United States Patent
Sekiguchi et al.

(10) Patent No.: US 11,174,765 B2
(45) Date of Patent: Nov. 16, 2021

(54) ABNORMALITY ASSESSMENT DEVICE OF INTERNAL COMBUSTION ENGINE

(71) Applicant: HONDA MOTOR CO., LTD., Tokyo (JP)

(72) Inventors: Toru Sekiguchi, Wako (JP); Takashi Konomoto, Wako (JP); Taku Hirota, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 185 days.

(21) Appl. No.: 16/742,128

(22) Filed: Jan. 14, 2020

(65) Prior Publication Data

US 2020/0256225 A1    Aug. 13, 2020

(30) Foreign Application Priority Data

Feb. 8, 2019   (JP) .............................. JP2019-021328

(51) Int. Cl.
| | |
|---|---|
| *F01M 13/00* | (2006.01) |
| *F01M 13/02* | (2006.01) |
| *F02M 35/10* | (2006.01) |
| *F02M 35/02* | (2006.01) |
| *F02M 25/06* | (2016.01) |

(Continued)

(52) U.S. Cl.
CPC ....... *F01M 13/028* (2013.01); *F02D 41/0025* (2013.01); *F02D 41/22* (2013.01); *F02M 25/06* (2013.01); *F02M 35/10006* (2013.01); *F02M 35/10157* (2013.01); *F02M 35/10222* (2013.01); *F01M 2013/0044* (2013.01); *F02D 2200/04* (2013.01); *F02M 35/02* (2013.01)

(58) Field of Classification Search
CPC .... F01M 13/028; F01M 13/02; F01M 13/023; F01M 13/00; F01M 13/021; F01M 2013/0044; F01M 2013/027; F01M 2013/0083; F01M 2013/0038; F02M 35/10373; F02M 35/10157; F02M 35/10222; F02M 35/10006; F02M 35/02; F02M 25/06; F02D 41/00; F02D 41/22; F02D 41/0025; F02D 41/123; F02D 41/18; F02D 2200/04; F02D 2250/08; Y02T 10/12; Y02T 10/40
See application file for complete search history.

(56) References Cited

U.S. PATENT DOCUMENTS

| | | | |
|---|---|---|---|
| 8,145,406 B2 * | 3/2012 | Satou ................. | F01M 13/0011 |
| | | | 701/103 |
| 9,382,823 B2 * | 7/2016 | Rollinger ............ | F02D 41/0025 |
| 9,714,590 B2 * | 7/2017 | Rollinger ............ | F01M 13/021 |

(Continued)

FOREIGN PATENT DOCUMENTS

JP        2017-78378 A      4/2017

*Primary Examiner* — Grant Moubry
(74) *Attorney, Agent, or Firm* — Westerman, Hattori, Daniels & Adrian, LLP

(57) ABSTRACT

An abnormality assessment device includes an on-off valve that shuts an intake path on an upstream side of a connection portion of a breather line with respect to the intake path and an abnormality assessment element that assesses abnormality of the breather line. The abnormality assessment element assesses abnormality of the breather line based on a difference between an intake flow rate that is detected by an intake flow rate sensor and a target intake flow rate in a case where the on-off valve is closed.

8 Claims, 4 Drawing Sheets

(51) Int. Cl.
    *F02D 41/00*     (2006.01)
    *F02D 41/22*     (2006.01)

(56) References Cited

U.S. PATENT DOCUMENTS

| | | | |
|---|---|---|---|
| 9,765,721 B2* | 9/2017 | Nakano | F01M 13/028 |
| 9,790,885 B2* | 10/2017 | Rollinger | F02M 35/10222 |
| 9,932,924 B2* | 4/2018 | Yoshioka | F01M 13/00 |
| 2014/0081564 A1* | 3/2014 | Pursifull | G01M 15/08 |
| | | | 701/113 |
| 2018/0291830 A1* | 10/2018 | Kurosawa | F01M 13/022 |

* cited by examiner

ABNORMALITY ASSESSMENT DEVICE OF INTERNAL COMBUSTION ENGINE

CROSS REFERENCES TO RELATED APPLICATIONS

The present application claims priority under 35 U.S.C. § 119 to Japanese Patent Application No. 2019-021328, filed Feb. 8, 2019, entitled "Abnormality Assessment Device of Internal Combustion Engine." The contents of this application are incorporated herein by reference in their entirety.

TECHNICAL FIELD

The present disclosure relates to an abnormality assessment device of an internal combustion engine in which an air cleaner, an intake flow rate sensor, a forced-induction compressor, and a throttle valve are in order arranged from an upstream side toward a downstream side of an intake path which starts from an intake port and reaches an intake manifold, the intake path on a downstream side of the throttle valve is connected with a crankcase via a PCV line, and the intake path between the air cleaner and the intake flow rate sensor is connected with the crankcase via a breather line.

BACKGROUND

Japanese Unexamined Patent Application Publication No. 2017-078378 discloses such an abnormality assessment device of an internal combustion engine as a second embodiment, for example. The abnormality assessment device of an internal combustion engine focuses on a fact that in a case where a connection portion of a breather line with respect to an intake path is detached, the connection portion becomes an opening end portion of an air column of the intake path and the resonance frequency of the air column thereby changes, monitors the magnitude of pulsation of the intake flow rate of the intake path, and thereby makes an assessment about detachment of the connection portion of the breather line.

SUMMARY

Incidentally, because the pressure pulsation in a crankcase is lessened as the number of cylinders of an internal combustion engine is increased, the pulsation of the intake flow rate of an intake path which occurs due to the pressure pulsation of the crankcase becomes small. Thus, in the abnormality assessment device that is disclosed in Japanese Unexamined Patent Application Publication No. 2017-078378 and makes an assessment about detachment of a connection portion of a breather line based on the magnitude of pulsation of an intake flow rate of an intake path, the precision of abnormality assessment possibly lowers.

It is desirable to certainly assess abnormality of a breather line of an internal combustion engine.

A first aspect of the present disclosure suggests an abnormality assessment device of an internal combustion engine, the internal combustion engine in which an air cleaner, an intake flow rate sensor, a forced-induction compressor, and a throttle valve are in order arranged from an upstream side toward a downstream side of an intake path which starts from an intake port and reaches an intake manifold, the intake path on a downstream side of the throttle valve is connected with a crankcase via a PCV line, and the intake path between the air cleaner and the intake flow rate sensor is connected with the crankcase via a breather line. The abnormality assessment device includes: an on-off valve that shuts the intake path on an upstream side of a connection portion of the breather line with respect to the intake path; and an abnormality assessment element that assesses abnormality of the breather line. The abnormality assessment element assesses abnormality of the breather line based on a difference between an intake flow rate which is detected by the intake flow rate sensor and a target intake flow rate in a case where the on-off valve is closed.

In a configuration of the first aspect, blowby gas in the crankcase may be returned to the intake path through the PCV line or the breather line.

Further, abnormality of the breather line may be assessed based on the flow rate of secondary air that flows from the breather line with abnormality into the intake path, and abnormality of the breather line may precisely be assessed as well even in a case where pulsation of the intake flow rate of the intake path is small because the number of cylinders of the internal combustion engine is large.

Further, in addition to the configuration of the first aspect, a second aspect of the present disclosure suggests the abnormality assessment device of an internal combustion engine, in which the on-off valve is closed at the time of fuel cut.

In a configuration of the second aspect, an abnormality assessment may be performed without influencing an output of the internal combustion engine.

Note that an air flow meter 16 in the embodiment corresponds to the intake flow rate sensor of the present disclosure, and a first connection portion 23 in the embodiment corresponds to a connection portion of the present disclosure.

BRIEF DESCRIPTION OF THE DRAWINGS

The advantages of the disclosure will become apparent in the following description taken in conjunction with the following drawings.

DETAILED DESCRIPTION

An embodiment of the present disclosure will hereinafter be described based on FIG. 1 to FIG. 4.

Figure 1:
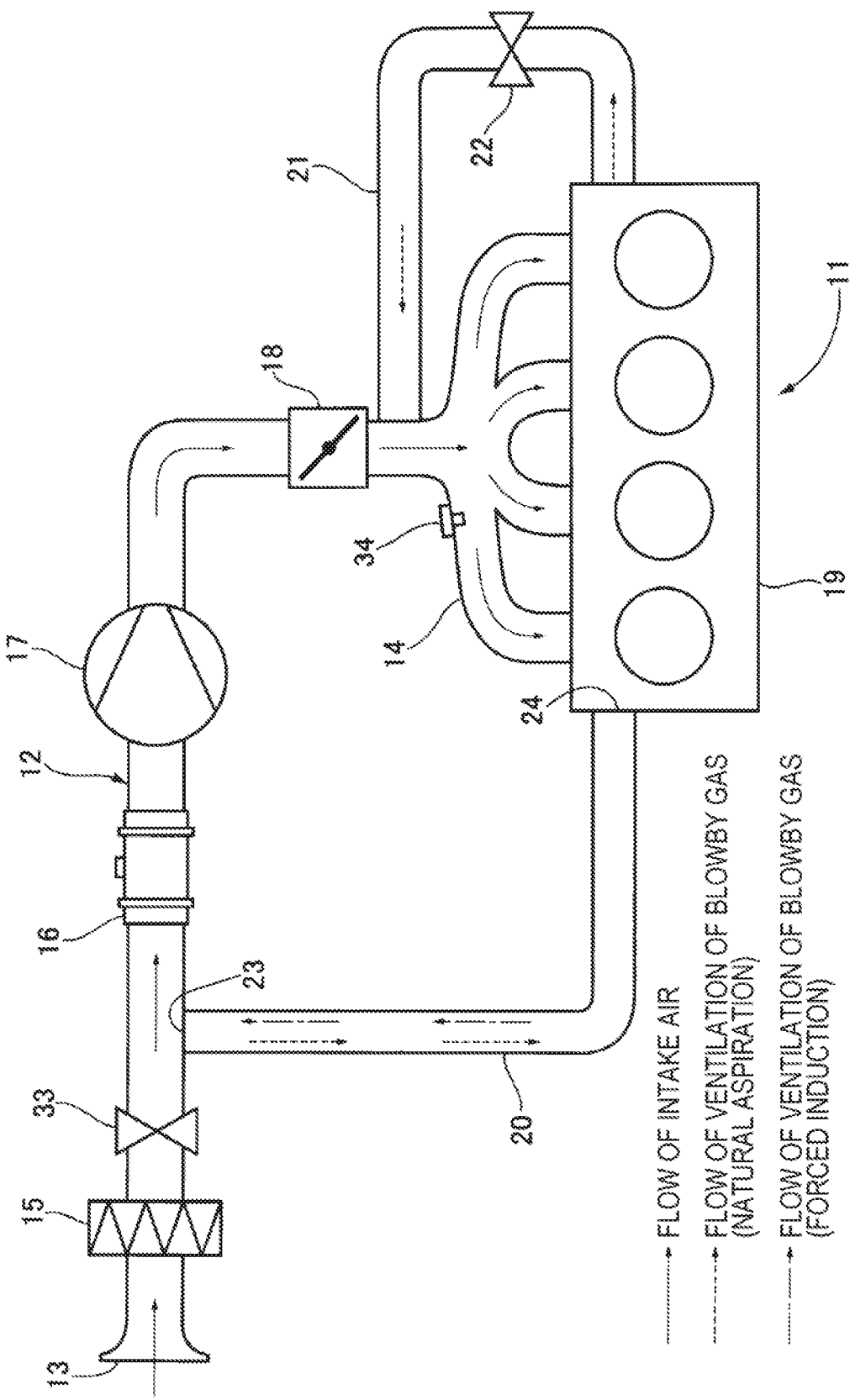
FIG. 1 is a diagram that illustrates a configuration of an internal combustion engine which includes an abnormality assessment device of a breather line of one embodiment.

As illustrated in FIG. 1, on an intake path 12 of an in-line four-cylinder four-cycle internal combustion engine 11 that is mounted on an automobile, from an intake port 13 at an upstream end in an intake flow direction toward an intake manifold 14 at a downstream end in the intake flow direction, an air cleaner 15 that removes dust in intake air, an air flow meter 16 that measures an intake flow rate, a forced-induction compressor 17 formed with a turbocharger or a supercharger that pressurizes the intake air, and a throttle valve 18 that throttles the intake path 12 and thereby adjusts the intake flow rate are arranged in order. A position interposed between the air cleaner 15 and the air flow meter 16 in the intake path 12 is connected with a crankcase 19 of the internal combustion engine 11 by a breather line 20. Further, the intake manifold 14 and the crankcase 19 of the internal combustion engine 11 are connected together by a positive crankcase ventilation (PCV) line 21, and an intermediate portion of the PCV line 21 is opened and closed by a PCV valve 22.

Blowby gas as a portion of fuel components included in the intake air, which flows from a combustion chamber of the internal combustion engine 11 into the crankcase 19 while passing through gaps between pistons and cylinders, is returned to the intake path 12 through the breather line 20 or is returned to the intake path 12 through the PCV line 21, and emission of the fuel components included in the blowby gas to the atmosphere is thereby inhibited.

That is, in a case where the PCV valve 22 is opened in natural aspiration in which the forced-induction compressor 17 does not operate, the atmospheric pressure acts on the intake path 12 on an upstream side of the throttle valve 18, but an intake negative pressure of the internal combustion engine 11 acts on the intake path 12 on a downstream side of the throttle valve 18. Thus, the intake air of the intake path 12 on the upstream side of the throttle valve 18 passes through the breather line 20, flows into the crankcase 19, is returned together with the blowby gas from there to the intake manifold 14 through the PCV line 21, and is finally, together with the intake air, supplied to the combustion chamber of the internal combustion engine 11.

Further, in forced induction in which the forced-induction compressor 17 operates, a forced induction pressure acts on the intake path 12 on a downstream side of the forced-induction compressor 17. However, the PCV valve 22 is closed, and the forced induction pressure is thereby inhibited from being dispersed to the crankcase 19 via the PCV line 21. Then, the blowby gas in the crankcase 19 is drawn to the intake path 12 by a negative pressure that occurs on an upstream side of the operating forced-induction compressor 17 and is, together with the intake air, supplied from there to the combustion chamber of the internal combustion engine 11 through the intake path 12.

Incidentally, in a case where a first connection portion 23 at which the breather line 20 is connected with the intake path 12 is detached in the forced induction of the internal combustion engine 11 or a case where a second connection portion 24 at which the breather line 20 is connected with the crankcase 19 is detached, the blowby gas that flows from the crankcase 19 toward the intake path 12 through the breather line 20 is possibly emitted to the atmosphere. Thus, it is requested to detect such abnormality of the breather line 20 and to issue an alarm.

Thus, in this embodiment, an on-off valve 33 that opens and closes the intake path 12 between the air cleaner 15 and the first connection portion 23 and a pressure sensor 34 that detects the pressure of the intake manifold 14 are provided.

Figure 2:
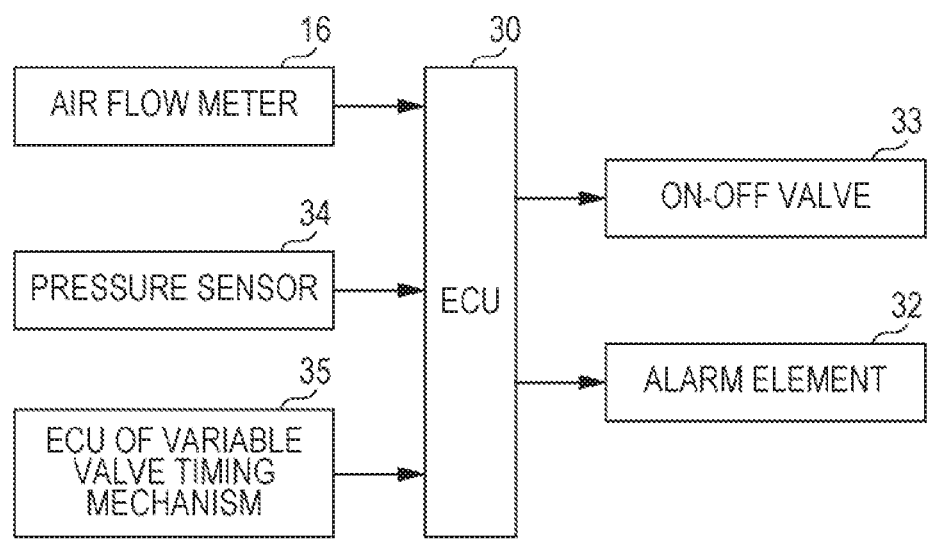
FIG. 2 is a block diagram of the abnormality assessment device of the breather line of one embodiment.

As illustrated in FIG. 2, with an abnormality assessment element 30 that assesses abnormality of the breather line 20 and is formed with an electronic control unit, the air flow meter 16, the pressure sensor 34, an ECU 35 of a variable valve timing mechanism, the on-off valve 33, and an alarm element 32 are connected. The alarm element 32 is configured with a liquid crystal panel provided to an instrument panel, for example.

Figure 4:
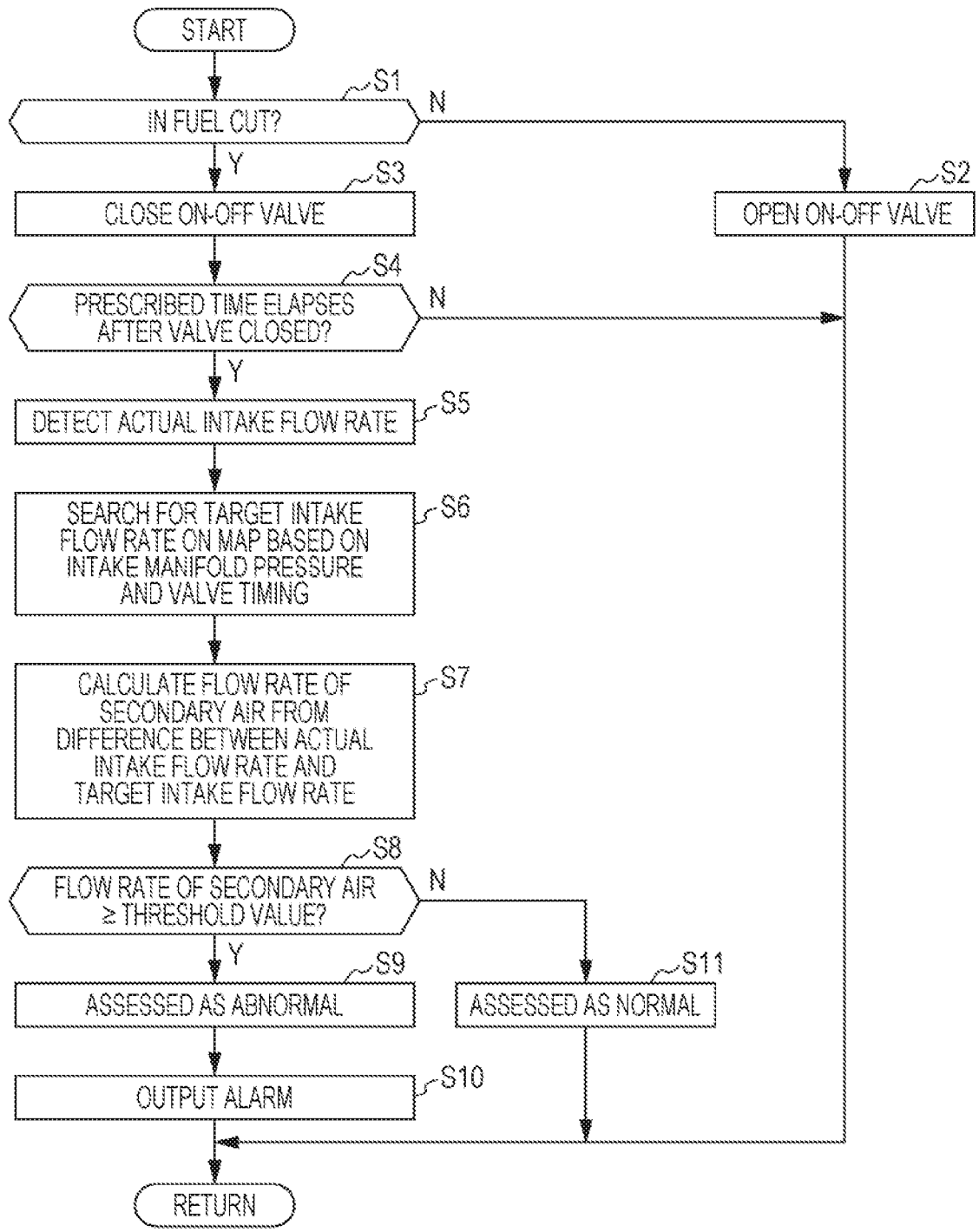
FIG. 4 is a flowchart that illustrates an action of the abnormality assessment device of the breather line of one embodiment.

Next, a description will be made about an action of the first embodiment of the present disclosure that includes the above configuration based on a flowchart of FIG. 4.

First, in step S1, in a case where the internal combustion engine 11 is not in fuel cut, an abnormality assessment of the breather line 20 is not executed, and in step S2, the on-off valve 33 is opened. In above step S1, in a case where the internal combustion engine 11 is in the fuel cut, in order to execute the abnormality assessment of the breather line 20, in step S3, the on-off valve 33 is closed. In step S4, when prescribed time elapses after the on-off valve 33 is closed and an intake flow becomes stable, in step S5, the intake flow rate (actual intake flow rate) of the intake path 12 is detected by the air flow meter 16.

Figure 3A:
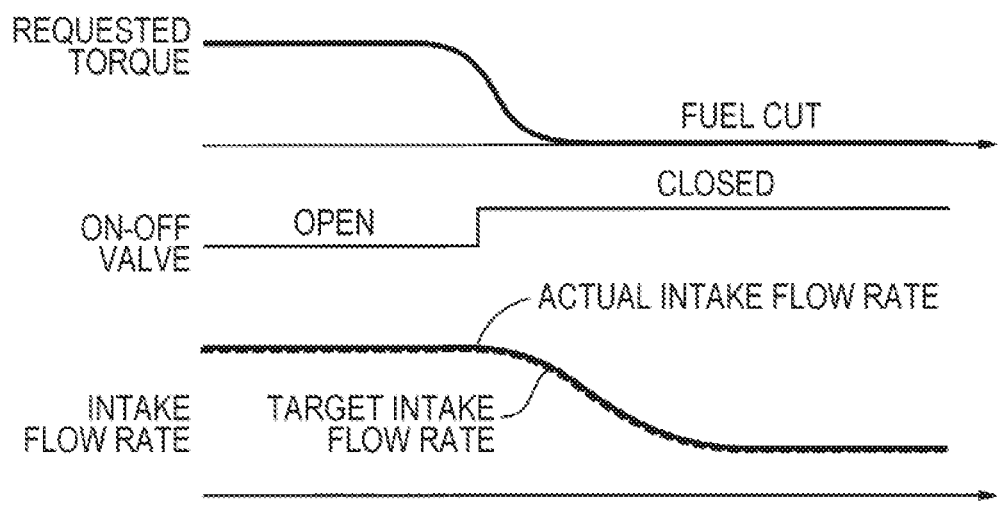
FIGS. 3A and 3B are timing diagrams for explaining a principle of an abnormality assessment of the breather line of one embodiment.
Figure 3B:
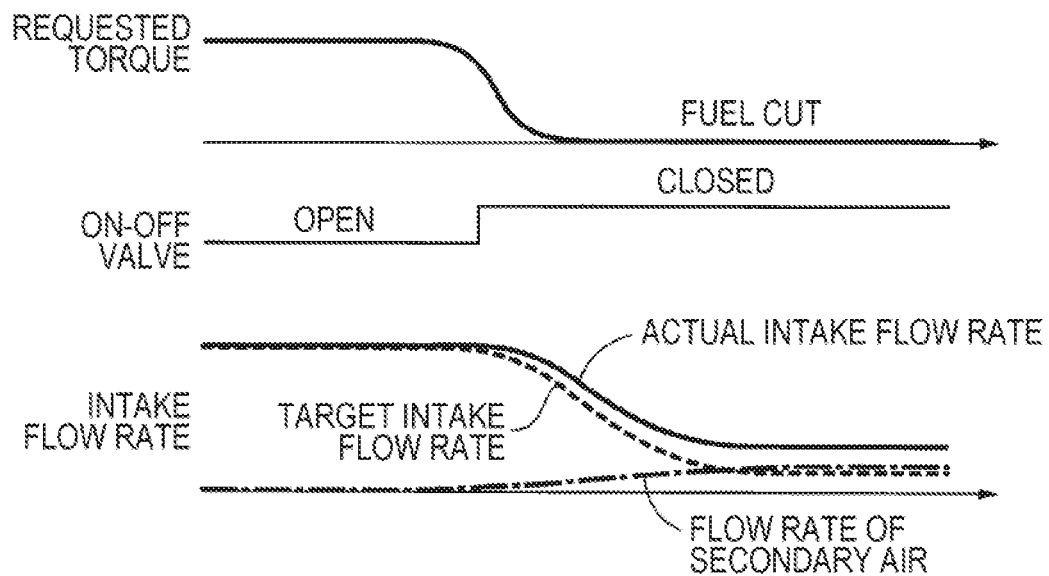

In this case, the on-off valve 33 is closed, and an upstream side of the intake path 12 is blocked. Thus, in a case where the breather line 20 is normal, as illustrated in FIG. 3A, the actual intake flow rate detected by the air flow meter 16 becomes a flow rate of a slight amount of air that is drawn from the crankcase 19 into the intake path 12 through the breather line 20. On the other hand, in a case where abnormality occurs to the breather line 20 and the breather line 20 is detached at the first connection portion 23 or the second connection portion 24 or a case where an intermediate portion of the breather line 20 is damaged, as illustrated in FIG. 3B, secondary air drawn through an abnormal portion of the breather line 20 flows into the intake path 12. Thus, the actual intake flow rate detected by the air flow meter 16 increases by the amount of the secondary air.

In following step S6, based on the pressure of the intake manifold 14 that is detected by the pressure sensor 34 and a valve timing signal of the internal combustion engine 11 that is transmitted from the ECU 35 of the variable valve timing mechanism, a target intake flow rate that corresponds to the intake flow rate predicted in a normal condition of the breather line 20 is searched on a preset map. In a case where the breather line 20 is normal, the target intake flow rate is reduced by closing the on-off valve 33. However, as illustrated in FIG. 3B, because the actual intake flow rate exceeds the target intake flow rate in a case where the breather line 20 has abnormality and secondary air flows thereinto, in step S7, the flow rate of the secondary air may be calculated by subtracting the target intake flow rate from the actual intake flow rate.

Then, in step S8, in a case where the flow rate of the secondary air is a threshold value or greater, in step S9, it is assessed that abnormality occurs to the breather line 20, and in step S10, an alarm is issued to an occupant by operating the alarm element 32. On the other hand, in step S8, in a case where the flow rate of the secondary air is less than the threshold value, in step S11, it is assessed that the breather line 20 is normal.

Hypothetically, in a case where an attempt is made to assess abnormality of the breather line 20 from a pressure fluctuation of the breather line 20 that occurs in response to vertical movement of the pistons of the internal combustion engine 11 or from an intake flow rate fluctuation of the intake path 12, there is a problem in that the assessment precision lowers because the pressure fluctuation of the breather line 20 or the intake flow rate fluctuation of the intake path 12 is small in the internal combustion engine 11 whose number of cylinders is large. However, in this embodiment, the flow rate of the secondary air drawn from the breather line 20 into the intake path 12 is calculated in a state where the on-off valve 33 is closed and the upstream side of the intake path 12 is blocked, and abnormality of the breather line 20 is assessed in a case where the flow rate of the secondary air is the threshold value or greater. Thus, a highly precise abnormality assessment may be performed regardless of the number of cylinders of the internal combustion engine 11. In addition, because the abnormality assessment is performed at the time of the fuel cut of the internal combustion engine 11, travel of a vehicle is not influenced by the output torque of the internal combustion engine 11 that changes due to the abnormality assessment.

In the foregoing, the embodiment of the present disclosure is described. However, various alterations in design of the present disclosure may be carried out in the scope that does not depart from the gist of the present disclosure.

For example, the number of cylinders of the internal combustion engine 11 is not limited to four cylinders in the embodiment.

Further, in the embodiment, the breather line 20 and the PCV line 21 are connected with the crankcase 19. However, an internal space of the crankcase 19 and an internal space of a head cover are caused to communicate with each other, the breather line 20 and the PCV line 21 are connected with the head cover, and actions and effects of the present disclosure may thereby be achieved also. Accordingly, configurations in which the breather line 20 and the PCV line 21 are connected with other spaces which communicate with the crankcase 19 are included in the technical scope of the present disclosure. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. An abnormality assessment device of an internal combustion engine, the internal combustion engine comprising an air cleaner, an intake flow rate sensor, a forced-induction system, and a throttle valve which are in this order arranged from an upstream side toward a downstream side of an intake path of the engine which starts from an intake port and reaches an intake manifold, the intake path located on a downstream side of the throttle valve is connected with a crankcase via a positive crankcase ventilation (PCV) line, and the intake path between the air cleaner and the intake flow rate sensor is connected with the crankcase via a breather line, the breather line including a connection portion connected to the intake path, the abnormality assessment device comprising:
    an on-off valve that shuts the intake path on an upstream side of the connection portion of the breather line; and
    an abnormality assessment element that assesses abnormality of the breather line, wherein
    the abnormality assessment element assesses abnormality of the breather line based on a difference between (i) an intake flow rate that is detected by the intake flow rate sensor in a case where the on-off valve is closed and (ii) a target intake flow rate in the case where the on-off valve is closed.

2. The abnormality assessment device of an internal combustion engine according to claim 1, wherein the on-off valve is closed at the time of fuel cut of the engine.

3. The abnormality assessment device of an internal combustion engine according to claim 2, wherein the abnormality assessment element stops assessment of the abnormality of the breather line when the fuel cut is not performed.

4. The abnormality assessment device of an internal combustion engine according to claim 1, wherein the abnormality assessment element closes the on-off valve, obtains the detected intake flow rate and the target intake flow rate.

5. The abnormality assessment device of an internal combustion engine according to claim 1, wherein the on-off valve is disposed on the upstream side of the connection portion of the breather line.

6. The abnormality assessment device of an internal combustion engine according to claim 1, wherein the abnormality assessment element determines occurrence of abnormality of the breather line when the difference is equal to or larger than a threshold.

7. The abnormality assessment device of an internal combustion engine according to claim 1, wherein the abnormality assessment element calculates the target intake flow rate based on a pressure in the intake manifold of the engine.

8. An abnormality assessment method of an internal combustion engine, the internal combustion engine comprising an air cleaner, an intake flow rate sensor, a forced-induction system, and a throttle valve which are in this order arranged from an upstream side toward a downstream side of an intake path of the engine which starts from an intake port and reaches an intake manifold, the intake path located on a downstream side of the throttle valve is connected with a crankcase via a positive crankcase ventilation (PCV) line, and the intake path between the air cleaner and the intake flow rate sensor is connected with the crankcase via a breather line, the breather line including a connection portion connected to the intake path, the method comprising steps of:
    Shutting, by closing an on-off valve, the intake path disposed on an upstream side of the connection portion of the breather line; and
    assessing by a computer abnormality of the breather line based on a difference between (i) an intake flow rate that is detected by the intake flow rate sensor in a case where the on-off valve is closed and (ii) a target intake flow rate in the case where the on-off valve is closed.

* * * * *